US007193333B1

(12) United States Patent
Kitch

(10) Patent No.: US 7,193,333 B1
(45) Date of Patent: Mar. 20, 2007

(54) LOW NOX EMISSION SINGLE SIDE ACCESS GAS ENGINE DRIVEN ELECTRICAL GENERATING SYSTEM

(76) Inventor: Timothy Blair Kitch, #6 Camelot Ct., Lake Oswego, OR (US) 97034

( * ) Notice: Subject to any disclaimer, the term of this patent is extended or adjusted under 35 U.S.C. 154(b) by 0 days.

(21) Appl. No.: 11/089,377

(22) Filed: Mar. 24, 2005

(51) Int. Cl.
*H02K 5/00* (2006.01)

(52) U.S. Cl. .......................... 290/1 A; 290/1 B; 322/1; 123/2

(58) Field of Classification Search ................ 290/1 A, 290/1 B, 2; 322/1; 123/2
See application file for complete search history.

(56) References Cited

U.S. PATENT DOCUMENTS 4,698,975 A * 10/1987 Tsukamoto et al. ........... 60/721
4,871,922 A * 10/1989 Heinrich et al. ............ 290/1 B
5,731,687 A * 3/1998 Hirano et al. .................. 322/1
5,899,174 A * 5/1999 Anderson et al. .............. 123/2
5,929,611 A * 7/1999 Scott et al. .................... 322/46
6,660,967 B2 * 12/2003 Brofft et al. ................ 219/133
6,784,574 B2 * 8/2004 Turner et al. ................ 310/58

* cited by examiner

*Primary Examiner*—Nicholas Ponomarenko

(57) ABSTRACT

The present invention is a gasoline engine driven electrical generating system for use in confined space enclosures wherein all routine servicing can be accomplished from the single exposed side. The ambient operating temperature of the confined enclosure is minimized by a combination of component locations, sizing and a thermal siphoning exhaust enclosure. Through the use of an electronic fuel management system, throttle body furl injection and a catalytic converter all current EPA NOX emission standards can be met.

16 Claims, 11 Drawing Sheets

LOW NOX EMISSION SINGLE SIDE ACCESS GAS ENGINE DRIVEN ELECTRICAL GENERATING SYSTEM

BACKGROUND OF THE INVENTION

The present invention relates to a extremely compact EPA certifiable gasoline engine driven electrical generating system (a "genset") and more particularly, to a compartment contained genset that may be completely single side serviced in situ, having access to all the routine maintenance components and access points.

Specialty motorcoaches, like intercity traveling medical facilities, make the most out of the least amount of space. To stay competitive in today's marketplace motorcoaches use multiple slide out side and rear compartments. While maximizing and increasing interior space these slide outs do restrict the usable space below the motorcoach's floor deck. The current industry standard size for a genset compartment (for a genset and it's compartment housing, excluding the muffler) is approximately 34 inches long, 25 inches deep and 26 inches high. This movement toward less usable space below the motorcoach's floor deck has occurred at the same time as motorcoach retailers have seen an increase in the secondary electrical demands of the motorcoach.

Generating more electrical power in a motorcoach can be accomplished two ways. One way is to operate the genset at higher running speeds (which results in an undesired increase in noise, heat output, vibration, mechanical wear and servicing.) Another way is to use larger engines and generators. These brutes can output more power running at lower speeds, but because of their physical volume, require larger housing compartments. Enlarging a genset compartment upwards or downwards necessitates a protuberance in the motorcoach floor or a reduction in the motorcoaches's ground clearance. Unfortunately, for aesthetical reasons motorcoach designers seek smooth floors and a straight visible door line about the motorcoach.

The longer gensets are too large for the existing available spaces along the length of the motorcoach with the slide outs. Since the available space for genset compartments is limited, if a larger genset is installed it will cramp the compartment, hinder access to maintenance points, and result in a higher compartment ambient air temperature which will be forced through the generator housing interior causing premature generator failure. Add to this conundrum, the need for additional mechanical equipment required to pass the updated EPA NOX emission and other regulations, and the problem magnifies. Thus, the need for diminutive, high electrical output gensets evolved.

The development of space restricted gensets has an additional problem to overcome. As with all partially enclosed heat generating engines, heat buildup, especially from the exhaust components is a problem. Generator coils and windings have narrow operating temperatures and the cooling air circulated through them must also be relatively free of excess airborne particulate. The gasoline engines themselves are prone to overheating in the enclosed compartments and must possess efficient heat removal capacity. To complicate matters, side access doors often must remain closed when the genset is operating, further restricting air flow and containing residual heat in the compartment.

Henceforth, a cool running, quiet, low speed, long life, small genset that can be serviced in situ and capable of meeting current EPA standards while producing a large power output, would fulfill a long felt need in the motorcoach industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a new genset that is able to fit into a size restricted enclosure of approximately 12.8 cubic feet and provide up to 17 kW of electrical power. It has many of the advantages mentioned heretofore and many novel features that result in a new genset which is not anticipated, rendered obvious, suggested, or even implied by any of the prior art, either alone or in any combination thereof.

In accordance with the invention, an object of the present invention is to provide an improved motorcoach genset capable of not returning fuel to the motorcoach's fuel tank as to comply with EPA regulations.

It is another object of this invention to provide an improved genset capable of meeting or exceeding current EPA NOX emission standards.

It is a further object of this invention to provide a single side access designed genset for motorcoaches that can be fully serviced in situ.

It is still a further object of this invention to provide for a genset that does not generate enough heat in an enclosed operation to overheat the generator or engine under a wide variety of operating conditions.

It is yet a further object of this invention to provide a quiet, low speed genset with an enhanced radiative exhaust heat removal capability to maintain lower genset compartment operating temperatures.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

NOTE: FIGS. 1, 2, 3, 4 and 6 show the genset with the cold air intake duct snorkel tube removed for clarity of illustration.

DETAILED DESCRIPTION

Pancake style generators are known for their short longitudinal axis style bodies. Here, to accommodate tight space configurations, the front (fan side) of a pancake generator is directly coupled to the back (flywheel end) of a conventional (driver) gasoline engine. To keep the overall dimension along the longitudinal axis of this assembly at the absolute minimum required, the system as discussed herein was invented.

The low emission, single side access gasoline engine driven electrical generating system of the present invention, (hereinafter “genset”), comprises a four-stroke four cylinder combustion engine directly coupled to a pancake style electrical generator, capable of delivering 13 KW at 120/240 VAC (50/50 Amp) and 60 Hz while idling at an 1800 rpm engine speed, or with a larger internal displacement engine, (17 KW at 1800 RPM) utilizing:

a catalytic converter;

a thermal syphoning heat riser;

computerized direct throttle body fuel injection system;

a pressurized engine coolant containment system;

a front side mounted oil filler tube/dipstick combination;

a front side mounted fuel cell;

a rear side mounted high capacity radiator and high CFM flow fan assembly with dual electric fans or a 90 degree shaft drive;

a rear side radiator grill louver system;

a front side mounted fuel injection Electronic Control Unit (ECU) receiving input signals from a
- front mounted hall effect engine speed sensor,
- front mounted coolant temperature sensor,
- front mounted intake air temperature sensor
- front mounted manifold pressure sensor, and
- top mounted exhaust gas oxygen sensor;

a front side mounted throttle plate motor;

a front side mounted fuel injector;

a front side mounted electrical power management and monitoring panel;

long life platinum spark plugs;

a catalytic converter;

a front side mounted air intake cannister;

a front side mounted engine starter;

a front side mounted starter solenoid;

a front side mounted coil;

a front side mounted distributor;

a front side mounted wiring harness; and a front side mounted engine alternator driven by the main crankshaft pulley.

This improved 13 KW genset was invented primarily to meet the industry standard space restrictions of a genset compartment housing unit which is approximately 34 inches long by 26 inches high by 25 inches deep (12.8 cubic feet) for housing a genset minus catalytic converter and exhaust muffler, on a motorcoach; while passing the EPA NOX emission standards for the genset engine and not compromising the motorcoach engine’s EPA fuel return regulations. The cramped quarters necessitated inventing a new genset design that could be serviced from the front or accessible side of the unit. Much of the technology is known in the industry and although discussed, is not the subject of this invention.

The detailed description and operation of the present invention is best understood in conjunction with the accompanying figures.

Figure 1:
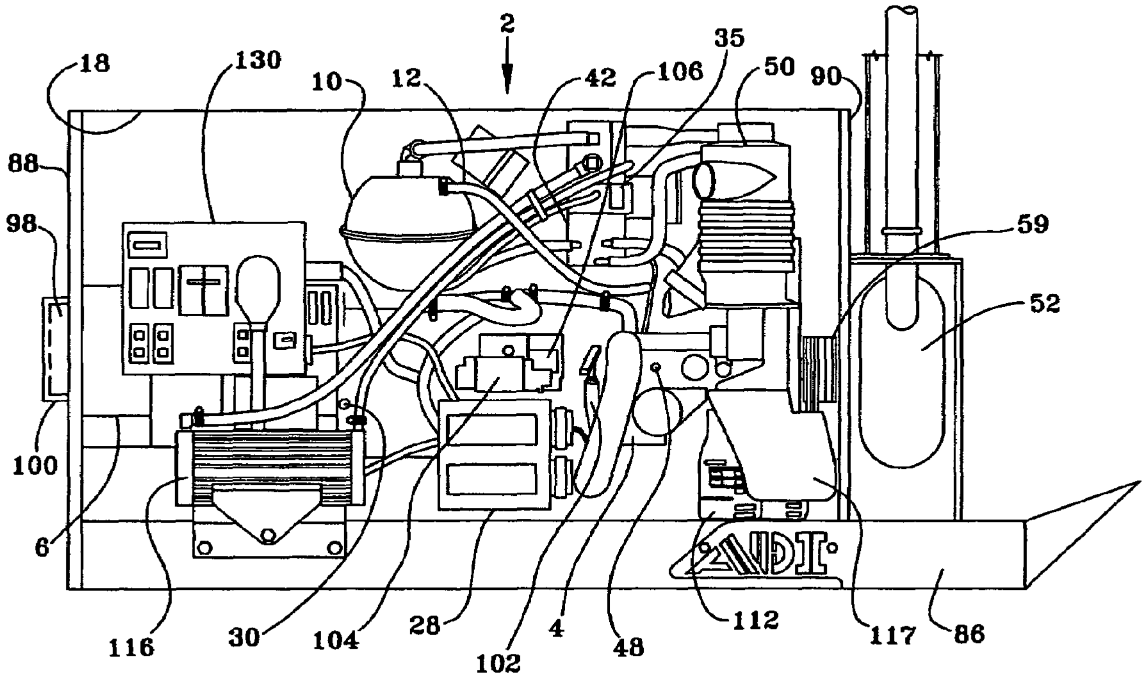
FIG. 1 is a front side view of the genset in the genset compartment housing unit showing the general arrangement of all components.
Figure 2:
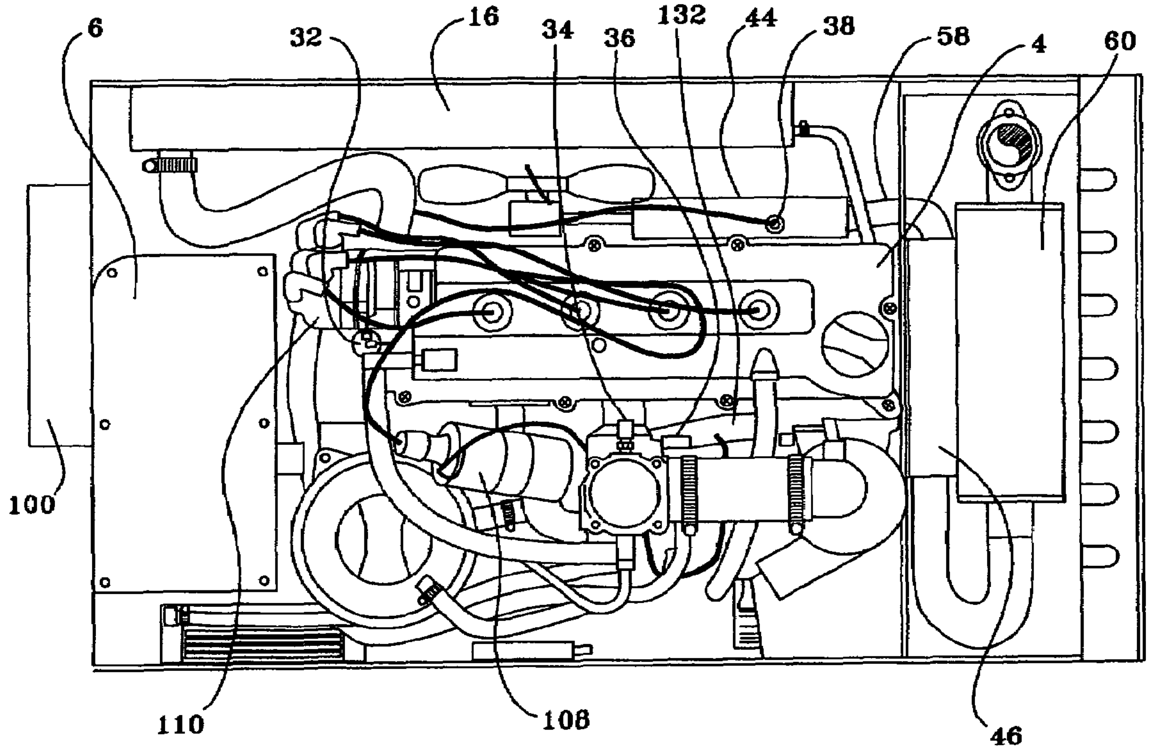
FIG. 2 is a top side view of the genset with the alternate embodiment shaft driven cooling fan in the genset compartment housing unit, showing the general arrangement of all components.
Figure 6:
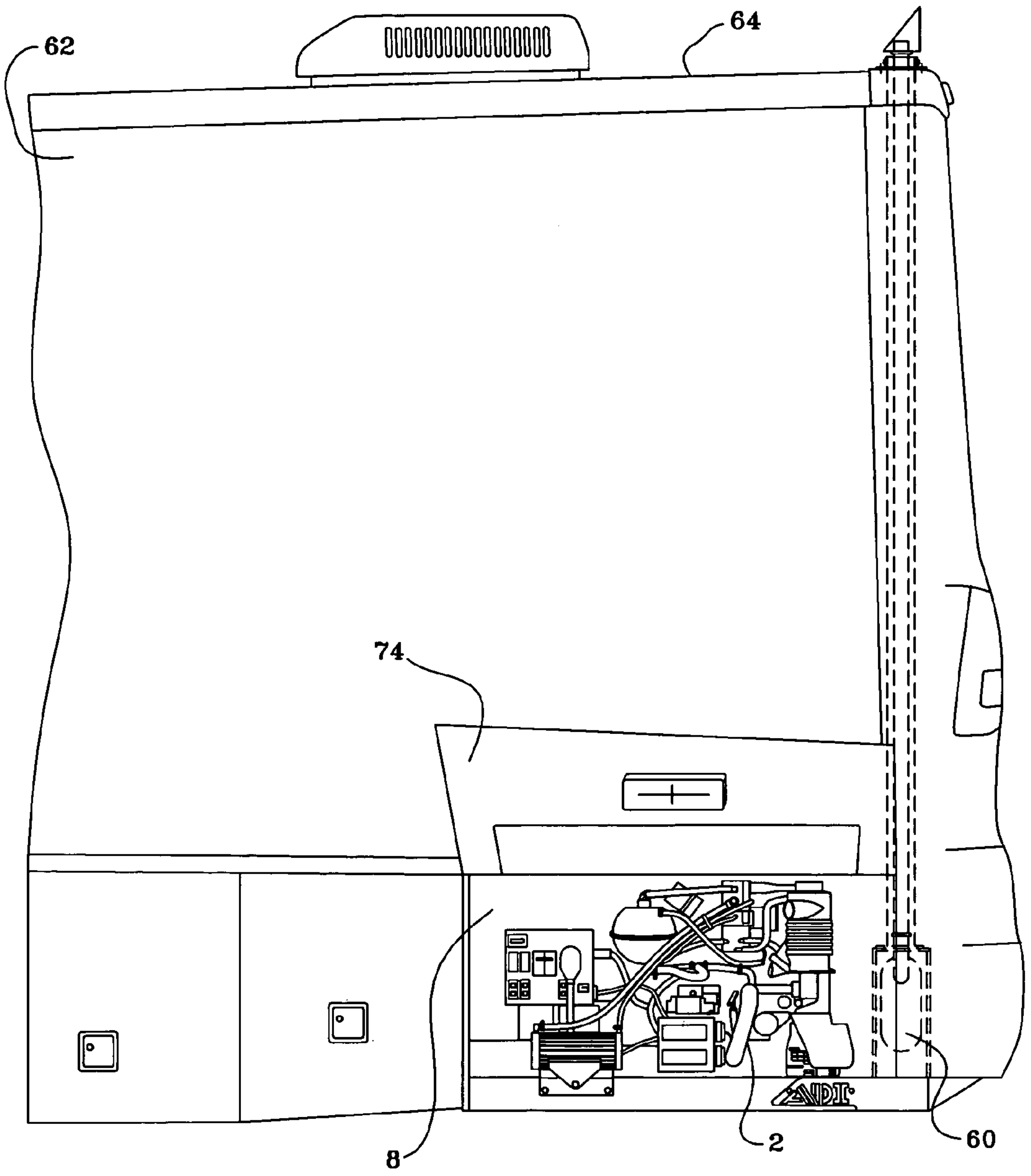
FIG. 6 is a front view of a motorcoach with an installed genset and genset housing unit illustrating the preferred embodiment exhaust system.

Referring to FIGS. 1, 2 and 6, it can be seen that the genset 2 utilizes a four cylinder gasoline engine 4 matingly engaged at the flywheel to the fan end of the rotor shaft of a pancake style electrical generator 6. The length of the complete genset unit is the distance bounded between the face of the engine crankshaft pulley 59 and the face of the generator’s exciter rotor diode cover 98. This length is approximately 36 and ⅝ inches. The industry standard dimensions for a genset housing 18 to be mechanically affixed to the chassis/undercarriage of a motorcoach 62 so as to fit in a genset compartment 8 is approximately 34 inches (plus or minus ¾ of an inch) by 26 inches in height by 25 inches in depth. Although the 34 inch length limitation discussed above is determined by the motorcoach’s aesthetic appearance, slideouts and frame design, there is slightly more length behind the motorcoach’s body panels and the genset compartment door 74 to allow for this 3 inch protuberance from the genset housing unit 18.

Since the length that will fit comfortably in a genset compartment housing unit 18 is approximately 33, and ½ inches and the length of the present invention is 36 and ⅝ inches, a circular orifice has been cut in the left side plate of the housing unit 88 to accommodate the extension of the generator exciter diode cover 98 outside of the housing unit 18 by approximately three inches. This allows the 34 inch wide genset housing unit 18 to hold and support the 36 and ⅝ inch long genset 2 and still fit into the genset compartment 8.

The genset 2 utilizes a 1274 cc internal displacement Nissan CG13, four cylinder, four cycle gasoline engine 4 coupled to a Marathon four pole, brushless, revolving field electric pancake generator 6 having a synchronous speed of 1800 rpm for a 60 Hz output frequency. (1500 rpm for 50 Hz) To achieve the 17 KW output a nominal 2000 cc internal displacement Nissan engine with a shorter flywheel housing is used, however engines from other manufacturers could be utilized provided their overall dimensions were substantially similar. All genset systems have been designed for single front side access when the genset 2 resides in it’s steel housing unit 18 within a motorcoach’s genset compartment 8, and most importantly, to minimize the genset length.

The genset fuel is drawn from the motorcoach’s fuel tank by an accumulator pump inside the front side mounted fuel cell 116. The inlet line from the motorcoach’s fuel tank is not visible in the drawings but resides behind the fuel cell 116 and the genset 2. The sealed fuel cell 116 also contains a high pressure fuel injector pump that moves the fuel to the variable orifice solenoid fuel injector which is mounted on the front side of the intake manifold/throttle body assembly 42 below the front side mounted throttle plate motor 35. The excess fuel at the injector is forced down a bypass line back to the fuel cell 116. In this manner there is no fuel returned to the motorcoach's fuel tank. (New EPA regulations for the year 2004 dictate that there cannot be any fuel returned to a motorcoach's fuel tank that was drawn out to support auxiliary equipment.)

The amount of fuel delivered into the intake manifold/throttle body assembly 42 is determined by a front side mounted Electronic Control Unit (ECU) 28 (also known as an electronic fuel management system). The ECU 28 generates and sends the fuel injector solenoid a pulse length signal based on an algorithmic determination using engine speed (RPM) engine coolant temperature, intake air temperature, intake air manifold absolute pressure and exhaust gas oxygen content. All but the exhaust gas oxygen sensor 38 are front mounted. Use of an ECU allows the engine 4 to run at peak efficiency with very low NOX emissions.

The engine speed signal comes from a hall effect sensor 30 mounted on the front side bell housing opening, with the hall effect elements mounted on the 288 teeth of the flywheel. The use of multiple hall effect elements results in a much larger number of sensed "events" per engine revolution. In this manner there is a much quicker and accurate engine speed signal sent to the ECU 28. This faster signal allows a quicker governed adjustment response from the ECU 28 to adjust fuel injection to compensate for engine load with the fluctuations of electrical load.

The engine coolant temperature sensor 32 is front side mounted into the engine cylinder head below the distributor 40. The intake air temperature sensor 34 and the manifold absolute pressure sensor 36 are each front side mounted in the intake manifold/throttle body assembly 42. The exhaust gas oxygen sensor 38 is mounted on the short exhaust header pipe 44 at the rear top side of the engine 4 before the catalytic convertor 46. The short header exhaust pipe 44 is bent to rise near the top of the engine 2 so as to allow access to the sensor from the front side.

An emergency low oil pressure shutdown sensor 48 is mounted in a hole extending into the oil gallery that is tapped into the front side of the engine block.

The engine 4 draws its air through an intake cannister 50 that is front side mounted in close proximity (approximately eight inches) to the muffler 52. A cold air intake snorkel tube 132 is connected at one end to the intake cannister 50 by a standard gear clamp 134 and extends through a duct orifice 136 in left side plate 88. In this manner, residual, radiant heat from the muffler 52 and engine 4 is not drawn into the running engine 2 where it could used in the combustion cycle, thereby affecting the NOX emissions. This feature, in conjunction with the exhaust heat riser system 10, helps to maintain an ambient air temperature genset compartment 8. Tests have shown with an outside ambient air temperature of 70 degrees F. the air temperature at the entrance to the intake cannister 50 is 74 degrees F.

The genset 2 utilizes a sealed pressurized coolant system operating at approximately 18 to 21 psi. This raises the boiling point of the coolant and eliminates the need for a radiator expansion header tank and a radiator filler cap. (It is noted that the use of this type of coolant system is also facilitated because the engine 4 runs at a constant rpm and in a narrow coolant temperature range such that there are no rapid fluctuations in coolant volume or coolant system pressure.) The pressurized accumulator tank 10 has an inlet line feeding from the top of the radiator 12 and an outlet line 14 that ties into the inlet of the water pump. The accumulator tank 10 is partially full and essentially "sits" on the system as a pressure and volume surge compensator.

Figure 3:
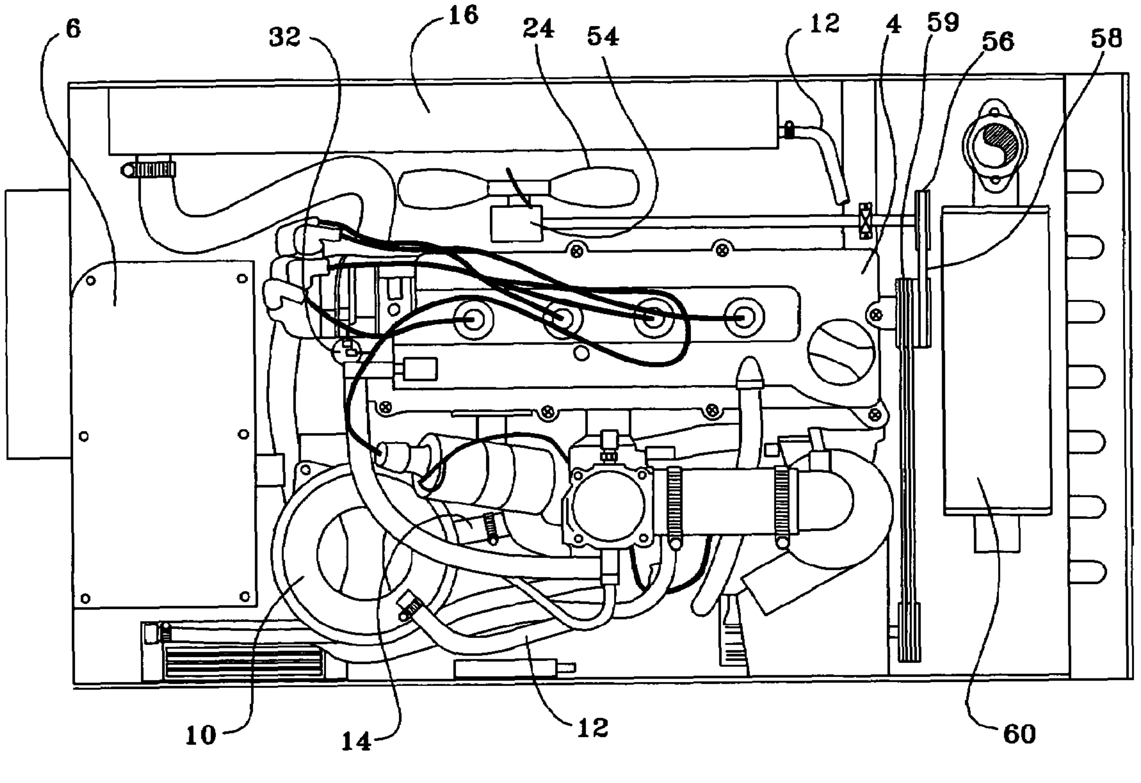
FIG. 3 is a top side view of the genset without the exhaust header pipe, showing the alternate embodiment shaft driven cooling fan and front side mounted alternator.
Figure 4:
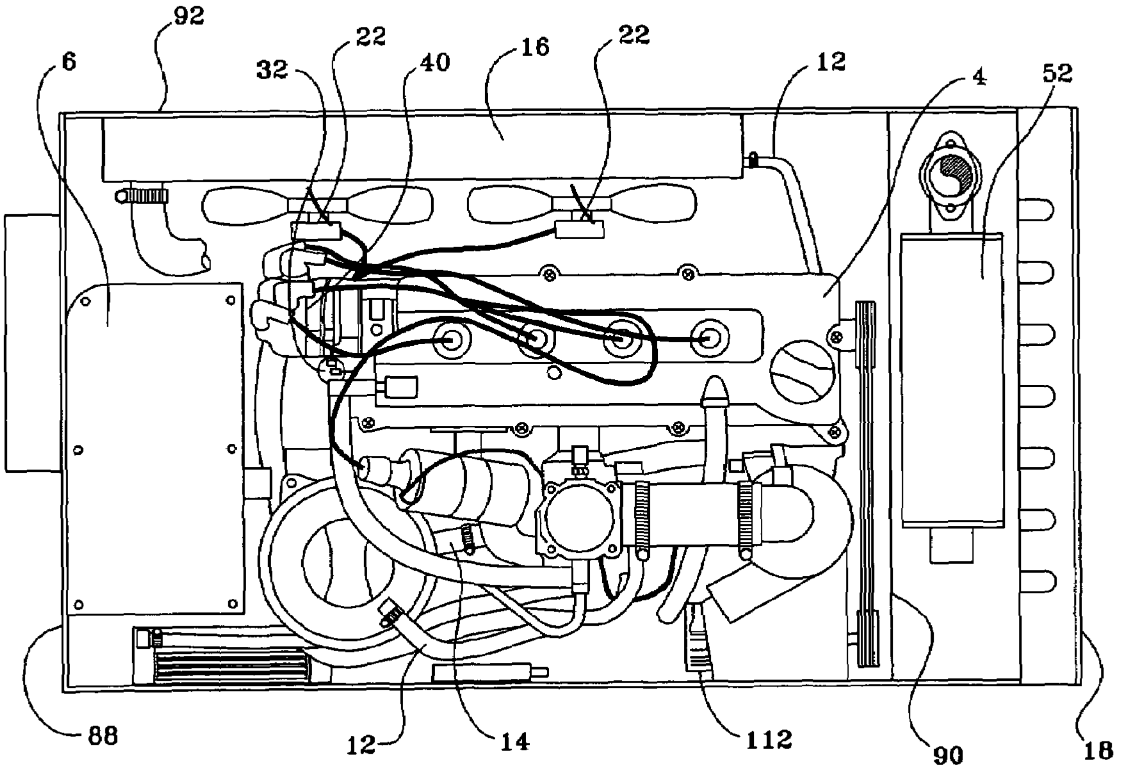
FIG. 4 is a top side view of the genset without the catalytic converter and exhaust header pipe, showing the preferred embodiment dual electric cooling fans.
Figure 5:
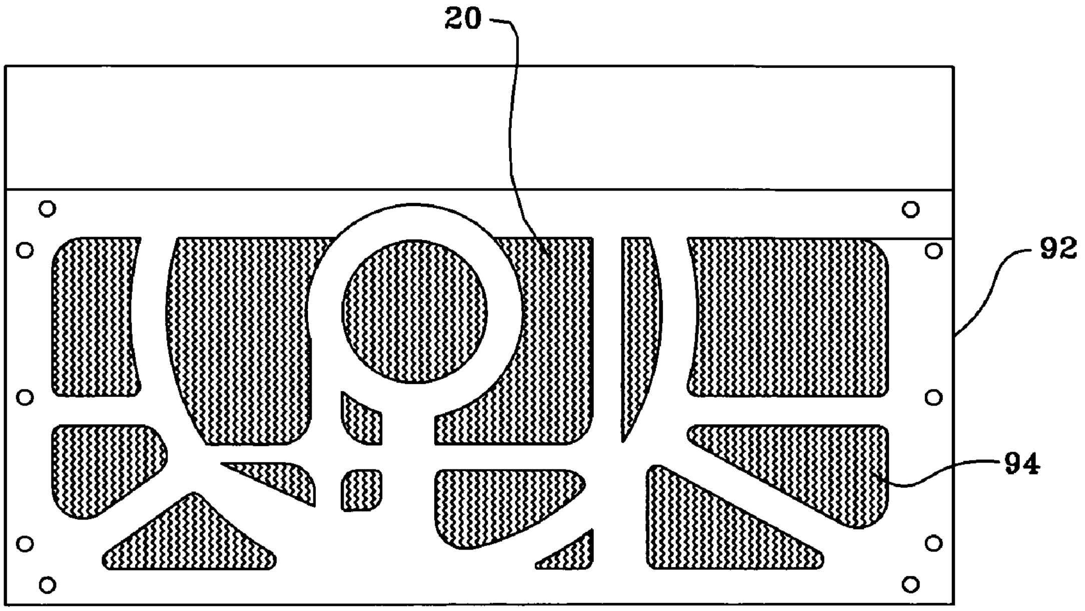
FIG. 5 is a back side view of the genset in the genset compartment housing unit showing the back side of the housing unit and the radiator.

Referring to FIGS. 3, 4 and 5 it is illustrated that the cooling system radiator 16 is a high heat removal capacity radiator (sized approximately 35% larger than one designed for conventional automotive use with a similarly sized engine) that is mounted in the genset compartment housing unit 18 behind the genset 2 such that their longitudinal axes are parallel. This unconventional placement helps to reduce the overall length of the genset 2. Air is moved through the radiator cooling fins 20 in either of two fan configurations.

The preferred embodiment (FIG. 4) utilizes two substantially similar electric 1250 cfm capacity fans 22 housed between the genset 2 and the radiator 16 that directs the flow of air away from the genset 2 and through the radiator fins 20. The electric fans 22 have an automatic cutout temperature switch that only allows the fans 22 to run when the coolant temperature exceeds 170 degrees F. This configuration is quieter and the dual fans 22 offer limited protection from overheating by virtue of their partial redundancy. The alternate embodiment (FIG. 3) utilizes a single larger 2400 cfm capacity fan 24 mechanically coupled to one end of an right angled shaft drive 54 having a driven pulley 56 mounted at it's distal end which is rotated by a belt 58 looped around the crankshaft driver pulley 59. This alternate embodiment arrangement operates whenever the genset 2 operates. It's drawback is that the right angled shaft drive 54 is loud and susceptible to belt slippage or belt failure.

Since most electrical generators should not operate continually in elevated ambient air temperatures exceeding 104 degrees F., it is important that the air temperature in the compartment 8 be maintained as low as practical. Thus, removing the hot air from the radiator 60 or exhaust before it accumulates in the compartment 8 is essential.

The genset exhaust system comprises an exhaust manifold, exhaust header pipe 44 with exhaust gas oxygen sensor 38, flex coupling 58, catalytic converter 46, and muffler 60. All but the catalytic converter 46 and muffler 60 are rear side mounted. The exhaust header pipe 44 is bent into an inverted "U" shaped configuration such that approximate center of the apex of the exhaust header pipe 44 rises to the top of the genset 3. The exhaust gas oxygen sensor 38 is mounted at the apex of the exhaust header pipe 44 and is thus accessible from the front side. The catalytic converter 46 is located directly beneath the muffler 60 and is also accessible for maintenance from the front side.

Figure 7:
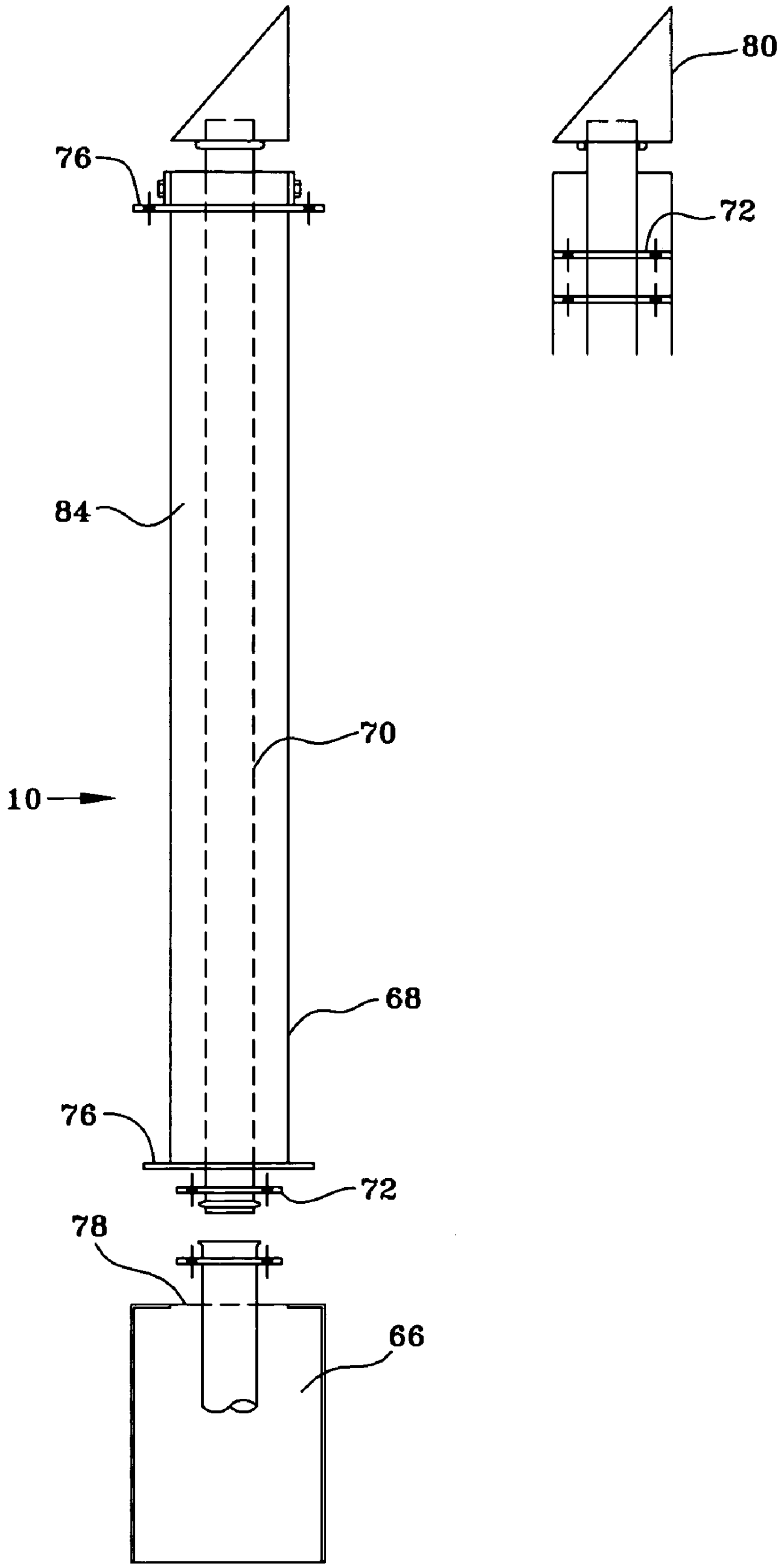
FIG. 7 is a detailed view of the components of the genset exhaust system's heat riser components.
Figure 8:
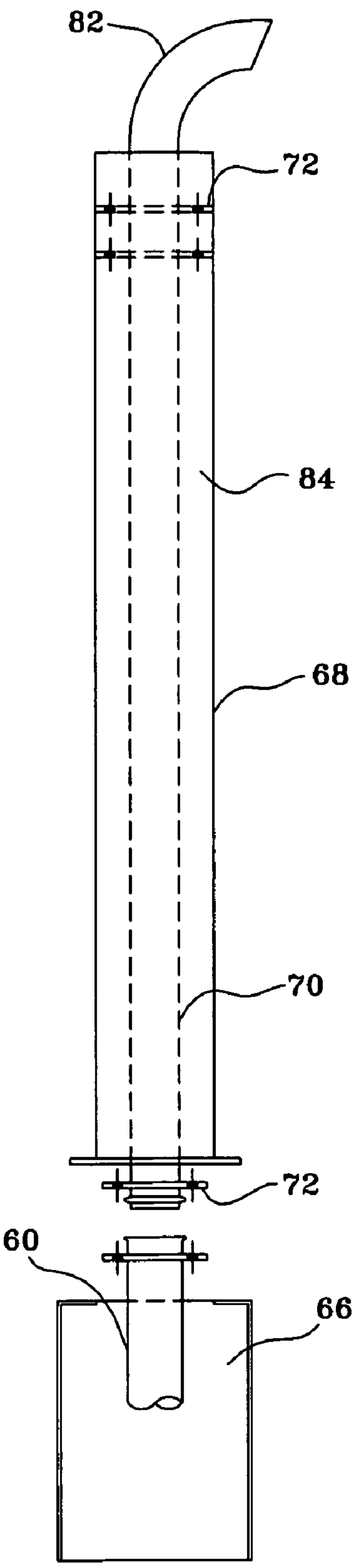
FIG. 8 is a detailed view of the components of the genset preferred embodiment exhaust system utilizing a bent exhaust pipe rather than a deflector.

Looking now at FIGS. 6, 7 and 8 it can be seen that there are two embodiments of the genset exhaust system, differing only in the manner of exhausting the gasses after the exit end of the muffler 60. The preferred embodiment exhaust system dumps exhaust gases above the roof line 64 of the motorcoach 62 and comprises a heat riser box 66, heat riser tube 68, exhaust pipe 70 and muffler 60. The alternate embodiment exhaust system dumps its exhaust gasses below the motorcoach chassis and does not have a heat riser box 66, heat riser tube 68 and may include an optional spark arrester. (The spark arrester is a US Forrest Services requirement for bottom exiting muffler exhausts.) Connections to the muffler 60 and catalytic converter 46 are accomplished via "O" ring ball and socket type muffler clamps 72.

The preferred embodiment exhaust system dusts the exhaust gasses above the roof line 64 which reduces the noise level experienced from the ground level but most importantly, utilizes the heat riser box 66 and riser tube 68 which reduces the genset compartment air temperature by about two degrees F. with the compartment door 74 open, and about three degrees F. with the door 74 closed. Although the hot exhaust can be efficiently drawn from the engine 4, the catalytic converter media and the muffler 60 retain and radiate heat that warms the genset compartment 8. Radiantly heated air from around the muffler 60 and catalytic converter 46 is partially contained in a 11 inch wide by 26 inch long by 13 inch high heat riser box 66. The heat riser pipe 68 is mounted on the top side of the heat riser box 66 about a circular orifice 78 in the box 66. The exhaust pipe 70 is of a smaller diameter than the nominal five inch heat riser pipe 68 and passes through the center of the heat riser pipe 68 such that they share the same longitudinal axis. The exit end of the exhaust pipe 70 terminates in an angled deflector 80 which protrudes slightly beyond the heat riser tube's exit end, above the motorcoach's rear roof line 64, although a simple bent exhaust pipe 82 (FIG. 8) has shown to perform satisfactorily. The exhaust pipe 70 is secured in the approximate longitudinal center of the riser pipe 68 by muffler clamps 72 at the top. A flange 76 adapted to fit onto the heat riser tube 68 secures the assembly to the motorcoach roof. The heated air in the box exits up the riser tube 68 with it's temperature rising slightly as it passes alongside the exhaust pipe 70. This creates a thermal siphoning effect in the annulus 84 between the exhaust pipe 70 and the heat riser tube 68 which increases the exiting flow of warm gasses from the heat riser box 66 to the atmosphere above the motorcoach 62. When the genset 2 is operated in a moving motorcoach 62 this thermal siphoning effect is enhanced.

Referring again to FIG. 1, the genset compartment housing unit 18 is a three sided steel container with a solid plate bottom 86 that serves to support the genset 2 and connect it to the undercarriage or chassis of the motorcoach 62. The left side plate 88, right side plate 90 and rear side plate 92 are bolted together through elongated oval slots that allow slight variations in the housing unit 18 dimensions. This allows compensation for fabrication variances in the motorcoach chassis as well as variances in different manufacturer's motorcoaches. The housing unit's bottom plate 86 is slightly above the visible line of the motorcoach body when the genset compartment's door 74 is closed. There is no front side or top side to the housing unit 18. The genset 2 is mounted to the floor plate 86 of this housing unit 18 with modified motor mounts.

Figure 9:
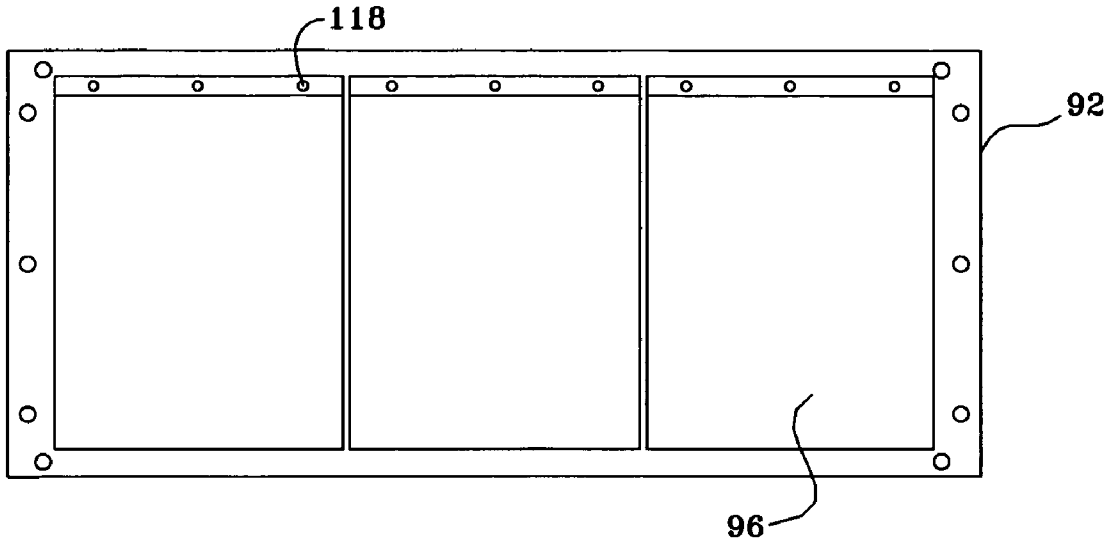
FIG. 9 is a back side view of the back side plate of the genset compartment housing unit showing the sound silencing louvers.

Referring to FIGS. 5 and 9, it can be seen that the rear side plate 92 has cutouts 94 that allow the flow of air passing across the radiator fins 20 to exit. There are flexible but resilient flap style louvers 96 that are attached with mechanical fasteners 118 to the rear side plate 92 cover the external side of the cutouts 94. These serve to quiet the genset noise and prevent the ingress of particulate contaminants to the genset compartment 8 while the motorcoach 62 is moving. The louvers 96 are opened by the differential in air pressure between the sides of the louvers 96 caused when the cooling system fan/s are running. There are three separate louvers 96 in the preferred embodiment however, testing has shown that there is a wide variation in the number and sizes of louvers 96 that will work and not reduce the flow of cooling air from the fans enough to cause temperature problems.

The right side plate 90 of the housing unit 18 has a cutout covered by a removable plate that allows access to the alternator pulley and water pump pulley, as well as the water pump and starter motor. The left side plate 88 has a circular cutout to accommodate the extension of the generator exciter diode cover 98 outside of the housing unit 18 by approximately three inches. There is a 13 inch by 14 inch raised protective plate 100 around the exciter diode cover circular cutout that bolts to the left side plate 88 of the housing unit 18. The left side plate 88 also has a duct orifice 136 through which cold air intake duct snorkel tube 132 passes.

In order to facilitate single side servicing of the engine 4, a front side oil filler tube/dipstick combination 102 has been incorporated. It has an inner diameter sufficient to allow the checking, addition and removal of oil from the front side of the genset 2. Although the height of the genset 2 while residing on the housing compartment unit 18 allows topside clearance to access the spark plugs, platinum long life plugs have been utilized to reduce the intervals between checking/changing. The engine starter 104 and starter solenoid 106 are front mounted as well as the coil 108, distributor 110 and wiring harness (not shown).

The dc power to start the genset 2 is drawn from electrical leads off of the motorcoach's battery. Once started and operational, the genset 2 has its own alternator 112 to provide for its dc power needs.

Figure 10:
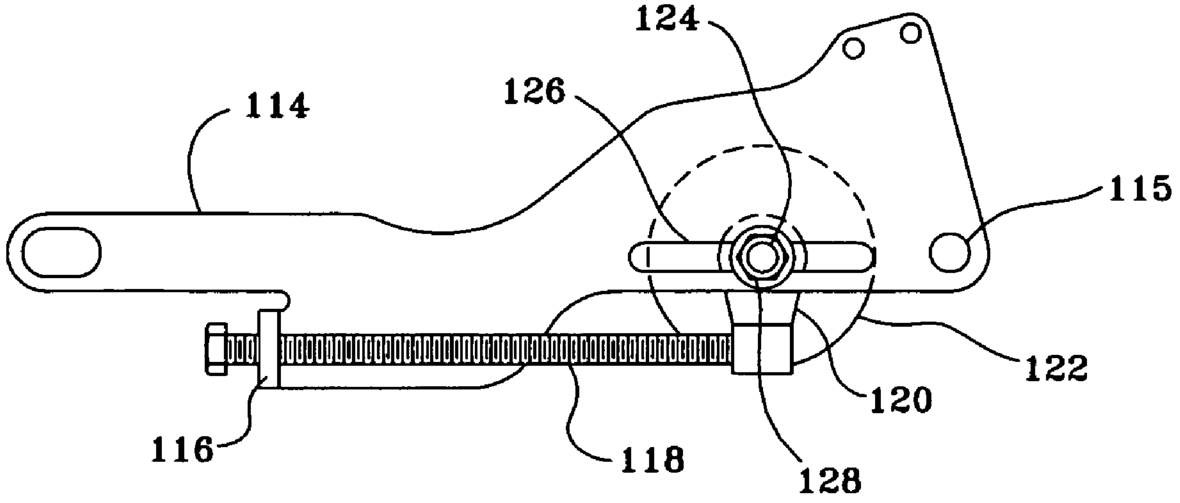
FIG. 10 is a front view of the adjustable alternator bracket.
Figure 11:
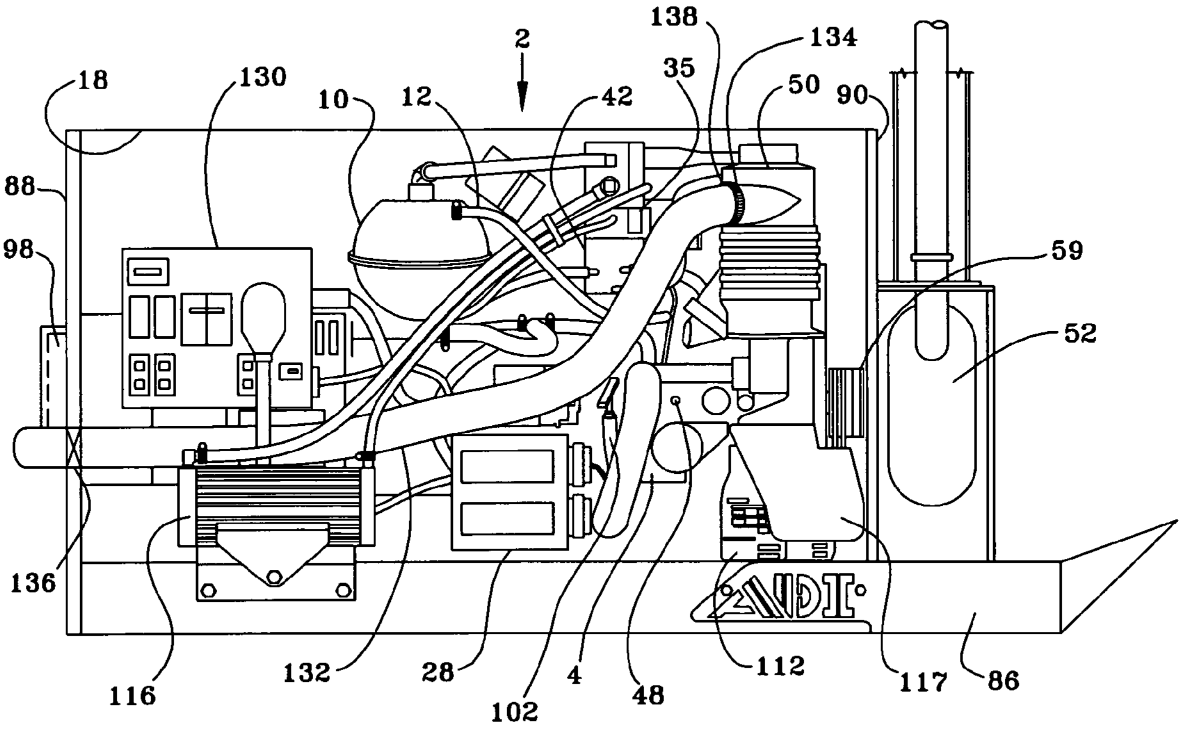
FIG. 11 is a front side view of the genset as in FIG. 1 but with the cold air intake duct snorkel tube installed.

FIG. 10 illustrates the alternator bracket 114. To allow access and proper operation of the alternator 112, a special bracket 114 has been developed that bolts into the front side of the engine block and is adapted to withstand the additional torque of using a belt looped between the main crankshaft pulley 59 and the alternator pulley to drive the alternator 112. This bracket 114 is of a generally planar configuration with several orifices 115 drilled therein for mounting of an alternator shield 117 and for the mechanical attachment to the engine block. At one end of the bracket 114 is a tab 116 residing normal to the longitudinal plane of the bracket 114 defining a hole therein adapted for threaded engagement with one end of an adjusting shaft 118. The other end of the adjusting shaft is mechanically affixed to a pulley support 120 that is adjacent the same planar surface of the bracket 114 upon which resides the tab 116. The pulley support 120 is adapted to retain the pulley 122 by the pulley axle 124 yet allow the pulley 122 to freely rotate about this axle 124. The pulley axle 124 extends through the pulley support 120 and through a slotted orifice 126 in the pulley bracket 114. The pulley axle 124 is threadingly engaged with a mechanical fastener arrangement 128 on the opposite planar side of the bracket 114.

In operation, the mechanical fastener 128 is loosened and the adjusting shaft 118 is rotated so as to cause the pulley support 120 to change its position along the slotted orifice 126 in the bracket 114, thereby adjusting the pulley position in relation to the crankshaft pulley 59. This increases or decreases the alternator belt tension. When the desired tension is reached the mechanical fastener 128 is tightened down onto into frictional engagement with the bracket 114 thereby holding the pulley 120 at that location.

Lastly, the power management system 130, is mounted on the front side of the genset 2. It has on it several fault warning and status indicators, such as those related to alternator operation, power to main circuit breakers, power from main circuit breakers, cooling and oil pressure as well as 120/240 V 50 A auxiliary power receptacle connectors.

This improved single side servicing accessed genset 2 is capable of a 13 KW electrical output while running quietly at 1800 rpm, maintaining a low compartment 8 operating temperature and fitting into a housing unit 18 having the maximum dimensions of 34 inches long by 26 inches high by 25 inches deep and suitably adapted for installation underneath a motorcoach 62.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

The invention claimed is:

1. A portable genset capable of generating up to 17 KW of electrical power, for use in a front side accessible confined enclosure comprising:
   - a gasoline engine mechanically coupled to an electrical generator, wherein
   - said genset has a maximum overall length of approximately 36 and ⅝ inches and is adapted for single, front side servicing, wherein said genset further comprising:
   - a front side mounted pressurized engine coolant containment system;
   - a front side oil filler tube/dipstick combination; a front side mounted fuel cell;
   - a rear side mounted radiator and fan assembly;
   - a front side mounted throttle plate motor;
   - a front side mounted throttle body fuel injector;
   - a front side mounted generator electrical power management and monitoring panel;
   - a front side mounted air intake canister with a breather tube adapted to draw air from outside the housing unit; and
   - a front side mounted fuel injection electronic control unit.

2. The genset of claim 1 wherein said genset is mechanically affixed to a housing unit measuring 34 inches long by 26 inches high by 25 inches deep which is adapted to be mechanically connected to the frame of a motorcoach so as to support said genset within said confined enclosure.

3. The genset of claim 2 wherein said gasoline engine is a four stroke, electronically fuel injected throttle body engine, and said generator is a pancake style generator, capable of producing a 13 KW, 60 Hz electrical output at an operating speed of 1800 revolutions per minute.

4. The genset of claim 3 further comprising:
   - a front side mounted pressurized engine coolant containment system;
   - a front side mounted oil filler tube/dipstick combination;
   - a front side mounted fuel cell;
   - a rear side mounted radiator and fan assembly;
   - a front side mounted throttle plate motor;
   - a front side mounted throttle body fuel injector;
   - a front side mounted generator electrical power management and monitoring panel;
   - a front side mounted air intake cannister; and
   - a front side mounted fuel injection electronic control unit.

5. The genset of claim 4 wherein said fuel injection electronic control unit receives input signals from:
   - a front mounted hall effect engine speed sensor;
   - a front mounted coolant temperature sensor;
   - a front mounted intake air temperature sensor;
   - a front mounted manifold absolute pressure sensor; and
   - a top mounted exhaust gas oxygen sensor.

6. The genset of claim 4 wherein said fuel injection electronic control unit receives input signals from:
   - a front mounted hall effect engine speed sensor;
   - a front mounted coolant temperature sensor;
   - a front mounted intake air temperature sensor;
   - a front mounted manifold absolute pressure sensor; and
   - a top mounted exhaust gas oxygen sensor.

7. The genset of claim 4 further comprising:
   - a front side mounted engine starter;
   - a front side mounted starter solenoid;
   - a front side mounted coil; and
   - a front side mounted distributor.

8. The genset of claim 1 further comprising a heat dissipation system external to said housing unit having:
   - a heat riser enclosure adapted to enclose a genset exhaust muffler
   - a heat riser tube having a first and second end; and
   - an exhaust pipe residing centrally within said heat riser tube and having a first and second end; wherein
   - said exhaust pipe's first end is connected to said muffler and said exhaust pipe's second end is rigidly affixed to said heat riser's second end, and wherein said heat riser enclosure has a top face that defines an orifice through which said exhaust pipe passes, and having an outer periphery about which said heat riser tube's first end is mechanically attached.

9. A gas engine driven electrical generating assembly adapted for single side maintenance and access, wherein
   - said assembly's maximum overall length is approximately 36 and ⅝ inches as measured from a front face of crankshaft pulley on said engine to the rear face of said generating assembly, wherein said generating assembly further comprising:
   - a heat dissipation system having:
   - heat riser enclosure adapted to enclose a genset exhaust muffler;
   - heat riser tube having a first and second end; and
   - an exhaust pipe residing centrally within said heat riser tube and having
   - a first and second end; wherein
   - said exhaust pine's first end is connected to said muffler and
   - said exhaust pipe's second end is rigidly affixed to said heat riser's second end, and wherein
   - said heat riser enclosure has a top face that defines an orifice through which said exhaust pipe passes, and having
   - an outer periphery about which said heat riser tube's first end is mechanically attached without an exhaust heat dissipation system.

10. The generating assembly of claim 9 wherein said assembly is adapted for use in a front side accessible, confined motorcoach enclosure and resides in a housing unit having the dimensions of 34 inches long, 26 inches high and 25 inches deep plus or minus 1 inch.

11. The generating assembly of claim 10 wherein said assembly is capable of generating up to 17 KW of electrical power at 60 HZ.

12. The generating assembly of claim 11 wherein said assembly generates 13 KW of 60 Hz electrical power at an engine speed of 1800 rpm.

13. The generating assembly of claim 12 wherein when said assembly is installed beneath a motorcoach, said engine utilizes gas from a gas tank of said motorcoach and wherein none of said gas used is returned to the motorcoach's fuel tank.

14. The generating assembly of claim 13 wherein said assembly generates 13 KW of 60 Hz electrical power at an engine speed of 1800 revolutions per minute.

15. A single, front side serviceable portable electrical generating system capable of delivering at least 13 KW of 60 Hz AC power at an 1800 rpm engine speed and adapted to fit into a 12.8 cubic foot housing unit measuring 34 inches long by 26 inches high by 25 inches deep, comprising:
   - a four-stroke, four cylinder throttle body fuel injected gasoline combustion engine; and a pancake style electrical generator;

wherein said system is adapted for single side servicing by the inclusion of:

a front side mounted pressurized engine coolant containment system;

a front side oil filler tube/dipstick combination;

a front side mounted fuel cell;

a rear side mounted radiator and fan assembly;

a front side mounted throttle plate motor;

a front side mounted throttle body fuel injector;

a front side mounted generator electrical power management and monitoring panel;

a front side mounted air intake cannister;

a front side mounted alternator;

a front side mounted starter and starter solenoid;

a front side mounted coil and distributor;

a front side mounted wiring harness; and a front side mounted fuel injection Electronic Control Unit (ECU) receiving input signals from:

a front mounted hall effect engine speed sensor;

a front mounted coolant temperature sensor;

a front mounted intake air temperature sensor;

a front mounted manifold absolute pressure sensor; and a top mounted exhaust gas oxygen sensor.

16. The portable electrical generating system of claim 15 further comprising a heat dissipation system external to said housing unit having:

a heat riser enclosure adapted to enclose a system exhaust muffler a heat riser tube having a first and second end; and an exhaust pipe residing centrally within said heat riser tube and having a first and second end; wherein said exhaust pipe's first end is connected to said muffler and said exhaust pipe's second end is rigidly affixed to said heat riser's second end, and wherein said heat riser enclosure has a top face that defines an orifice through which said exhaust pipe passes, and having an outer periphery about which said heat riser tube's first end is mechanically attached.

* * * * *